(12) United States Patent  
Narayanaswamy (10) Patent No.: US 7,668,877 B1  
(45) Date of Patent: Feb. 23, 2010

(54) SYSTEM AND METHODS FOR DEFINING A CANONICAL QUERY EXPRESSION

(75) Inventor: Arun Narayanaswamy, Westborough, MA (US)

(73) Assignee: EMC Corporation, Hopkinton, MA (US)

( * ) Notice: Subject to any disclaimer, the term of this patent is extended or adjusted under 35 U.S.C. 154(b) by 307 days.

(21) Appl. No.: 11/233,838

(22) Filed: Sep. 23, 2005

(51) Int. Cl.  
*G06F 12/00* (2006.01)

(52) U.S. Cl. ...................................... 707/204

(58) Field of Classification Search ............... 707/2, 707/3, 4, 204; 711/161, 162  
See application file for complete search history.

(56) References Cited

U.S. PATENT DOCUMENTS

| | | | | |
|---|---|---|---|---|
| 5,701,460 A * | 12/1997 | Kaplan et al. | ............... | 707/3 |
| 6,009,422 A * | 12/1999 | Ciccarelli | ............... | 707/4 |
| 6,275,819 B1 * | 8/2001 | Carter | ............... | 707/2 |
| 2003/0229624 A1 * | 12/2003 | Petrisor et al. | ............... | 707/3 |
| 2005/0027693 A1 * | 2/2005 | Yagawa | ............... | 707/3 |
| 2005/0086554 A1 * | 4/2005 | Simes | ............... | 714/4 |
| 2005/0149505 A1 * | 7/2005 | Bossman et al. | ............... | 707/3 |
| 2006/0074857 A1 * | 4/2006 | Etzold et al. | ............... | 707/3 |
| 2006/0195425 A1 * | 8/2006 | Deem et al. | ............... | 707/3 |

* cited by examiner

*Primary Examiner*—Cheyne D Ly  
(74) *Attorney, Agent, or Firm*—Chapin IP Law, LLC (57) ABSTRACT

A system and method for providing a canonical query expression employable by a plurality of application tasks which may be invoked by a SAN management application avoids successive regeneration of extensive queries Each of the application tasks employs the canonical form of the same query, allowing multiple reports and actions to be invoked without reentry of the query by the user. In this manner, a user need not repeat the query entry for each invocation of a report or task. Rather, the canonical query form is provided to each application task for which a report or action is requested. Each of the application tasks, therefore, employs the canonical query expression. The canonical form defines a set of identifiable portions of a syntactical expression. The application tasks invoke some or all of the portions of the query expression derived from the initial syntax. Users or operators invoke the application tasks for providing a report, action, or other result.

20 Claims, 6 Drawing Sheets

SYSTEM AND METHODS FOR DEFINING A CANONICAL QUERY EXPRESSION

BACKGROUND

In a modern information processing environment, transactional data is often generated in the course of normal operations. With the advent of ever increasing storage capacity and processing resources, such transactional data has the potential to become large and cumbersome, as additional information and audit trail capability is sought. In a storage area network (SAN), for example, a management application generates transactions corresponding to operational data such as storage used, storage available, frequency of access, queue depths, and other statistical information. This statistical information is valuable from a diagnostic and maintenance perspective to identify areas of potential backlog and pinpoint performance shortfalls.

Statistical information gathered from the SAN is useful in several contexts, such as forecasting future trends, tracking usage, and planning capital expenditures. Often, the transactional data is stored in a relational database for query and reporting capability. Relational databases have gained popularity for storing transactional data gathered from an information processing system. More recently, so-called multidimensional databases have provided a mechanism for storing and querying transactional data according to many attributes, or dimensions, such as time, location, product, department, and any combination, permutation, and/or subdivision thereof. While flexible, such multidimensional databases, also known as OnLine Analytical Processing (OLAP) systems, tend to be computation and storage intensive. A modern OLAP system has the potential to generate huge quantities of queryable data, and enables complex queries that require substantial computational resources.

In such OLAP systems, as in relational databases (often the underlying storage mechanism in OLAP systems), data is stored in tables having associations to other tables. A conventional query processor processes requests for information by performing database operations, such as selections, view, and join operations which traverse the associations between tables and retrieve the requested information. In a large database, having many interrelated tables and fields (attributes), a query may specify a large number of field, tables, and operations. Conventional queries often employ a standard syntax, such as the Structured Query Language (SQL), for specifying each particular query.

A conventional large managed information environment, such as a storage area network (SAN), accumulates many transactions resulting from ongoing operation of the system. These transactions represent the usage and throughput of the system as entries in various database tables. In the storage area network, these transactions are the result of data access requests and associated operations among the manageable entities in the storage area network. The transactions are stored in a large database operable to provide configuration and management control of the manageable entities in the SAN. A conventional network storage management application also queries this database for diagnostic and preventative matters such as providing feedback, monitoring past throughput, and identifying resource utilization, bottlenecks, and performance shortfalls.

SUMMARY

In a storage area network (SAN), various reports and queries are often performed concerning manageable entities (e.g. storage arrays, connectivity devices, and hosts) in the SAN. Reports and queries provide information about SAN activity, performance, and throughput. Conventional reports may be employed for trending analysis, forecasting, and other planning and/or diagnostic purposes. For example, an IT manager may want to know how long a particular set of storage arrays will continue to satisfy demand, or respond to an allegation of an access contention (slowdown) at a particular recurring time. Often, reports are employed in an iterative manner to identify an appropriate action. Several iterations of analysis and corrective action may be employed to address a particular circumstance or issue. Conventional management reports enabling such analysis are prepared individually, and each involves a query employed by an application task for generating the requested information. Accordingly, analysis of a particular issue or scenario involves several conventional queries employed by different applications to generate reports directed to addressing the particular issue or scenario.

Configurations discussed herein, therefore, are based in part in the observation that conventional report analysis and action endeavors require a query specification for each iteration or execution of an application task. No reuse or normalization of a conventional query expression is performed. Accordingly, a user requesting such analysis reports is typically required to enter a conventional query via a GUI or other interface successive times for each iteration or execution of an application task providing the desired report or action. It would be beneficial, therefore, to define a normalized query form, or canonical form, which is reusable across several application tasks for performing reporting and/or actioning activities based on the same query.

Therefore, configurations herein substantially overcome the above described shortcomings of conventional reporting, analysis, and actioning applications by providing a canonical query expression employable by a plurality of application tasks which may be invoked by a SAN management application. Each of the application tasks employs the canonical form of the same query, allowing multiple reports and actions to be invoked without reentry of the query by the user. In this manner, a user need not repeat the query entry for each invocation of a report or task. Rather, the canonical query is provided to each application task for which a report or action is requested.

In accordance with configurations of the invention discussed herein, a SAN management application includes a plurality of application tasks responsive to query expressions. Users or operators invoke the application tasks for providing a report, performing an action, or other result. Depending on the context or scenario for which a query or action is desired, a series of application tasks may be required to achieve the particular goal. A typical scenario is, for example, to perform several reports on a query-defined set of information (records), culminating with a task action for bringing about a desired result. Each of the application tasks, therefore, employs the same canonical form of the query expression. The canonical form is, in the exemplary configuration, derived from an SQL expression, and defines a set of identifiable portions of the SQL expression. The application tasks invoke some or all of the portions of the query expression derived from the initial SQL expression in SQL syntax. Therefore, a user may invoke multiple application tasks without reentering the query since each may employ the canonical form to obtain the needed portions.

For example, one common operation might be to delete all entries (records) older than a particular interval, say 90 days. A conventional query might select a date, title, and other fields from a table where the date is beyond a certain range, and display the date, title, and other information about the entry. A report displays these fields to the user. However, the corresponding delete needs only the date selection criteria, and need not retrieve the actual field values included in the report, since the record is being deleted. The application task for deletion equipped according to principles of the invention need only receive the conditional portion (i.e. where date=) of the canonical form, and is not concerned with the selection (retrieval) of attribute values as is the application task for reporting.

In further detail, the method for defining a canonical metadata query definition according to exemplary configurations herein includes defining a query expression including individually accessible portions, and performing a reporting action accessing at least a portion of the query expression to provide analysis data. An analytical process (i.e. automated or manual interpretation of the results) identifies, from the analysis data, a results action to be performed. The management application then invokes the identified results action using at least a portion of the query expression.

In the exemplary configuration, defining the query expression involves generating the query expression having individually accessible query portion from a syntactical form such as SQL. The management application receives the syntactical form from a graphical user interface, such that the syntactical form has a predetermined format adapted to specify at least one of selection criteria, conditional criteria and join criteria. Defining the query expression further includes identifying portions of an SQL expression, and extracting portions of the SQL expression. The individually accessible portions of the canonical query expression, therefore, correspond to criteria in the SQL syntactical form.

The management application performs the reporting action and the results action by invoking at least one application task operable to perform task actions, such that the task actions are operable to interrogate the database and generate an output result. In the exemplary configuration, the reporting action and the results action employ the same query expression. The reporting action and results action are both task actions, and the management application performs task actions to determine a conclusion, such that the task actions are performed by different application tasks using portions derived from the same query expression, therefore effectively reusing the canonical query expression rather than redefining a SQL expression in SQL syntax.

In the exemplary configuration, a query request results in the task action requests being received by the application task, in which the application task is responsive to the task action request and is operable to employ the query expression to access the database.

Defining the query expression further comprises defining a canonical query expression operable to be employed by an application task to perform a task action for accessing the database entries corresponding to the query expression. More complex analysis is achieved by iteratively performing the reporting action and results action, such that invoking the results action occurs without redefining the query expression employed for the reporting action, reusing the canonical expression by successive application task invocations. Therefore, the management application performs a first task employing particular portions of the canonical form, analyzes the results of the first task, and performs a second task responsive to the results of the first task employing particular portions of the canonical form.

Alternate configurations of the invention include a multiprogramming or multiprocessing computerized device such as a workstation, handheld or laptop computer, cellphones or PDA device, or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations discussed further below provide a system and method for providing a canonical query expression employable by a plurality of application tasks which may be invoked by a SAN management application. Each of the application tasks employs the canonical form of the same query, allowing multiple reports and actions to be invoked without reentry of the query by the user. In this manner, a user need not repeat the query entry for each invocation of a report or task. Rather, the canonical query is provided to each application task for which a report or action is requested. Such arrangements herein substantially overcome the above described shortcomings of conventional reporting, analysis, and actioning applications by effectively reusing the query definition (i.e. SQL query), thus relieving an operator from successive re-entry or regeneration of extensive or long queries.

In accordance with configurations of the invention discussed herein, a SAN management application includes a plurality of application tasks responsive to query expressions. Users or operators invoke the application tasks for providing a report, performing an action, or other result. Depending on the context or scenario for which a query or action is desired, a series of application tasks may be required to achieve the particular goal. A typical scenario is, for example, to perform several reports on a query-defined set of information (records), culminating with a task action for bringing about a desired result. Arrangements herein provide that each of the application tasks, therefore, employs the same canonical form of the query expression. The canonical form is, in the exemplary configuration, derived from an SQL expression, and defines a set of identifiable portions of the SQL expression. The application tasks invoke some or all of the portions of the query expression derived from the initial SQL expression in SQL syntax. Therefore, a user may invoke multiple application tasks without reentering the query since each application task may employ the canonical form to obtain the needed portions.

Figure 1:
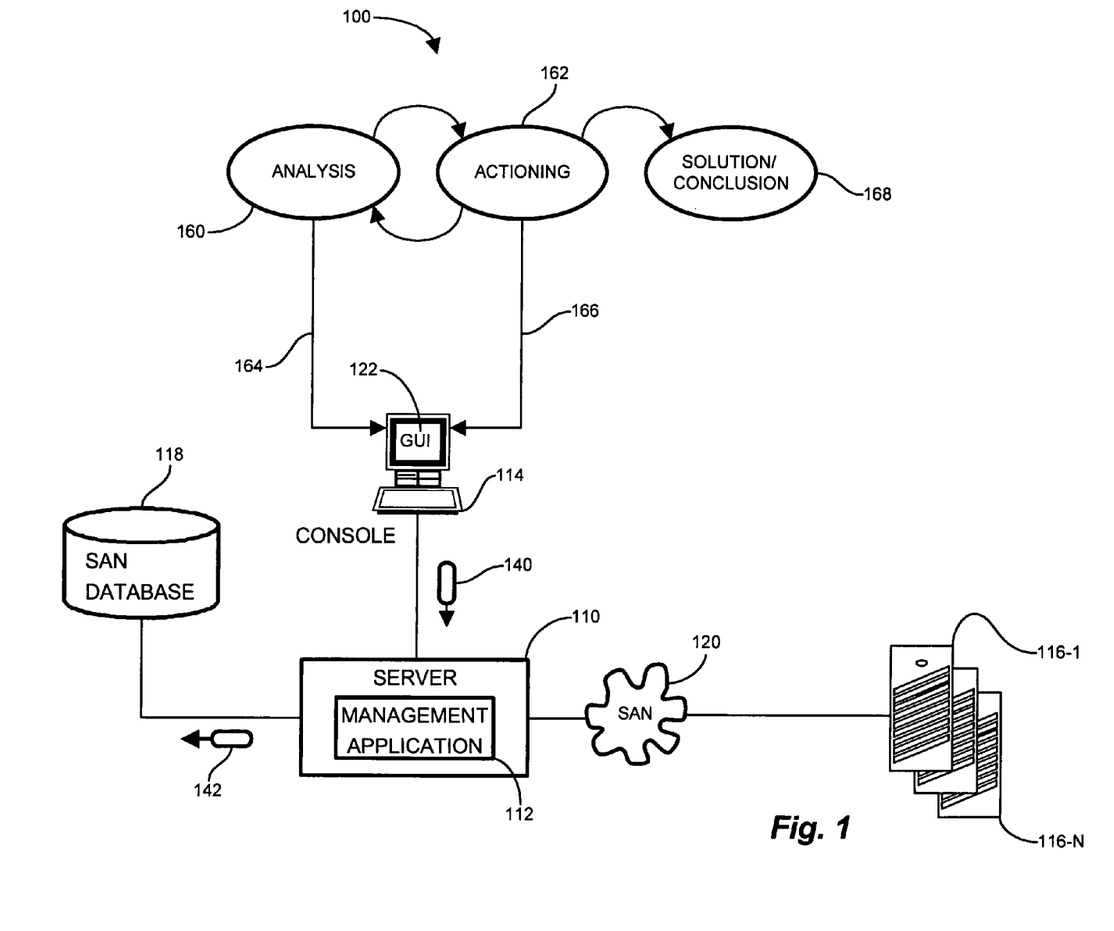
FIG. 1 is a context diagram of an exemplary managed information environment suitable for use with configurations discussed herein.

FIG. 1 is a context diagram of an exemplary managed information environment suitable for use with configurations discussed herein. Referring to FIG. 1, in an exemplary storage area network (SAN), a server 110 executes a management application 112 responsive to a console 114 for managing a plurality of manageable entities 116 interconnected via the SAN 120. The SAN 120 interconnects a plurality of manageable entities such as storage arrays 116-1 . . . 116-N (116 generally), collectively operable to provide information retrieval services to a user community (not specifically shown).

The console 114 includes a GUI 122 for directing the management application 112. In a typical context, the GUI 122 provides an interface for invoking application tasks of the management application 112 for providing reports and actions concerning the SAN 120. During normal operation of the SAN 120, various operational issues concerning the SAN arise. Such operational issues typically require a plurality of reports followed by one or more actions, both performed by application tasks (discussed further below) of the management application 112. An invocation request 140 to the management application 112 triggers a query request 180 to the database 118. Accordingly, employing configurations herein, the user or operator enters a query directed at solving the particular operations issue, and performs multiple application tasks via the management application 112.

Figure 3:
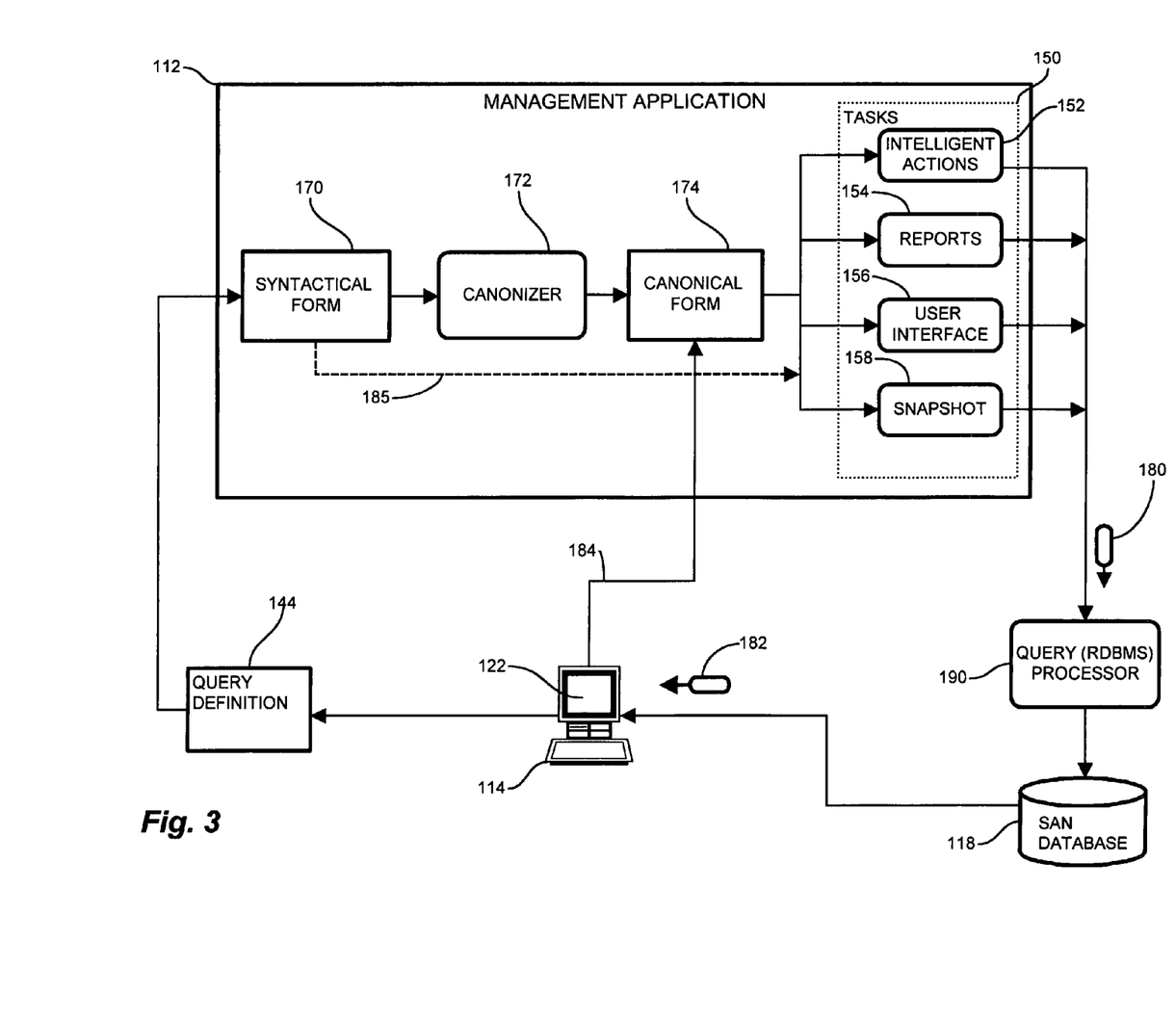
FIG. 3 is a block diagram of a management application employing canonical queries in the environment of FIG. 1.

An exemplary scenario includes an analysis 160 of a problem or issue, triggering an action such as GUI invocation 164 of a report. The report leads to further analysis 160, which leads to further actions 162 such as additional reports or corrective action, also via GUI invocation 164. The iterative application of application tasks for analysis 160 and actions continues until a solution or conclusion 168 is reached. Through configurations herein, multiple invocations 164, 166 of application tasks iterate through the analysis 160 and actioning 162 phases using the same canonical query 170 (FIG. 3, below). Each invoked application task 172 employs the corresponding portions of the canonical query 170, relieving the user from redefining or reentering the query criteria for each application task invocation.

Figure 2:
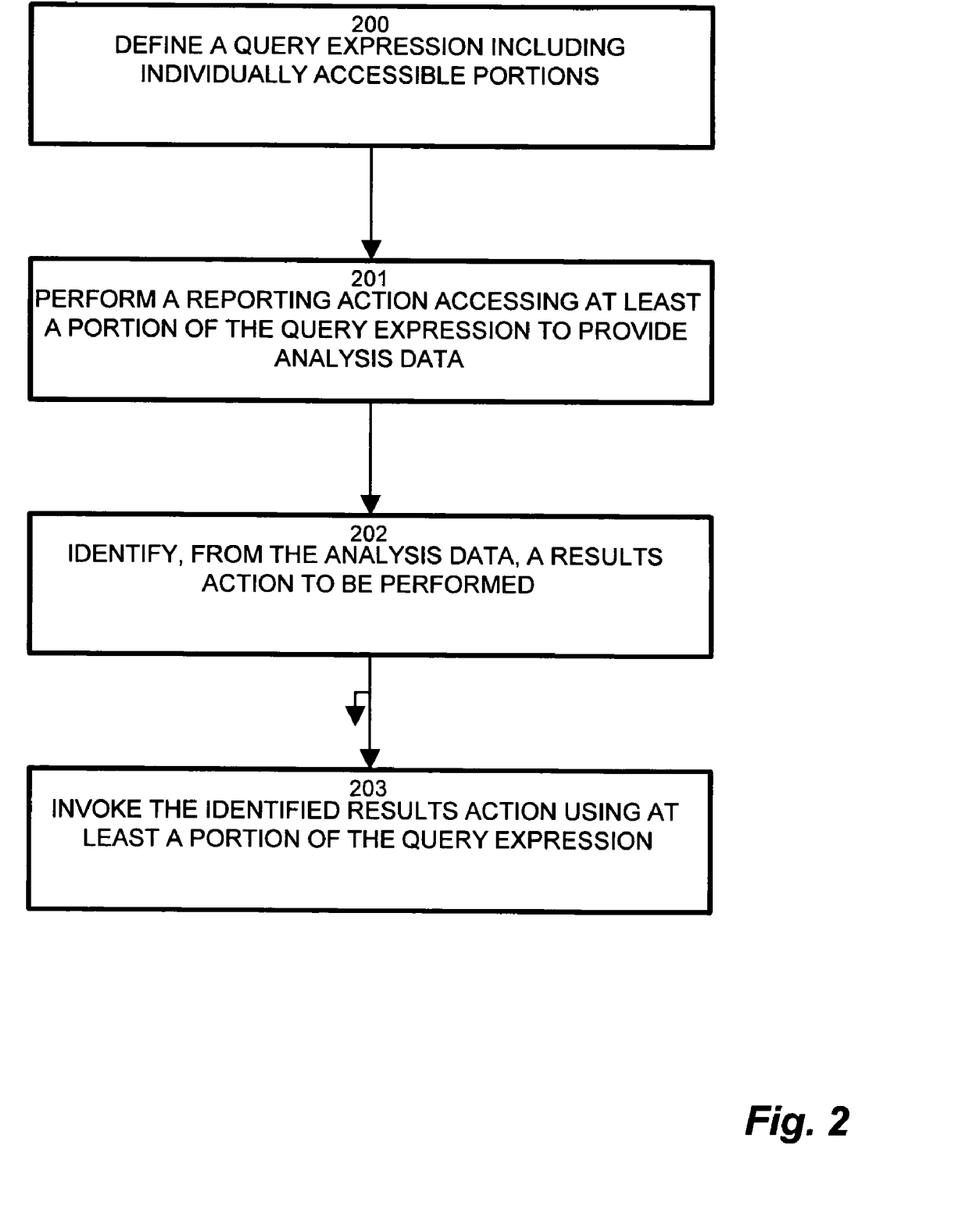
FIG. 2 is a flowchart of canonical query usage in the system of FIG. 1.

FIG. 2 is a flowchart of canonical query usage in the system of FIG. 1. Referring to FIGS. 1 and 2, at step 200 the method for defining a canonical metadata query definition includes defining a query expression including individually accessible portions. The defined query expression identifies portions of a SQL statement, such as SELECT, FROM and WHERE clauses, and is employed to compute a metadata equivalent which is interpretable by other application tasks as well. The application tasks 150 (FIG. 3, discussed below) perform a reporting action accessing at least a portion of the query expression to provide analysis data, as depicted at step 201, by invoking one of the application tasks (150, below) to perform a task action. At step 202, based on the results of the task action, the management application 112 identifies, from the analysis data, a results action to be performed. The results action may involve user/operator scrutiny of the analysis data, or may involve a more automated computation. The management application, at step 203, invokes the identified results action (application task 152, 154, 156 or 158) using at least a portion of the query expression.

FIG. 3 is a block diagram of the management application 112 employing canonical queries in the environment of FIG. 1. Referring to FIGS. 1 and 3, in the SAN environment 100, the management application 112 includes a plurality of application tasks 150. The application tasks 150 are each operable to perform task actions using a query definition 144 specified by a user (e.g. via a user device 114). In the exemplary configuration, the application tasks 150 include intelligent actions 152, reports 154, user interfaces 156, and snapshots 158. In a typical scenario, a user employs a query definition 144 as input to a task 150. Configurations herein receive the query definition 144 in a syntactical form 170, such as a SQL statement. A canonizer 172 receives the syntactical form 170, parses it and computes a canonical form of the query expression 174 having portions corresponding to different syntactical elements of the syntactical form, and operable for different purposes. The respective tasks 150 employ the canonical form 174, using the portions needed for the task action performed by the respective task.

The invoked tasks 150 generate a DBMS query request 180 for use by the native DB query processor 190. The query processor 190 is a query engine integrated with the DB, such as an Oracle® DBMS serving an Oracle database. The query processor 190 performs the query request 180 on the database 118, and produces an output result 182, which may be displayed, confirmed, or acknowledged on the user GUI screen 122, depending on the task action performed. Following the results of a particular task action, the same canonical form 174 is employable by the same or other tasks 150 for performing successive task actions, as shown by arrow 184. The user need not generate another query definition for successive invocations of the application tasks 150. In this manner, respective tasks 150 perform task actions using the appropriate portions of the canonical form 174 of the query without reentry of the query by the user. Absent the canonical form 174, separate generation of the syntactical form 170 would need to be employed for each application task invocation, as shown by dotted line 185.

Figure 4:
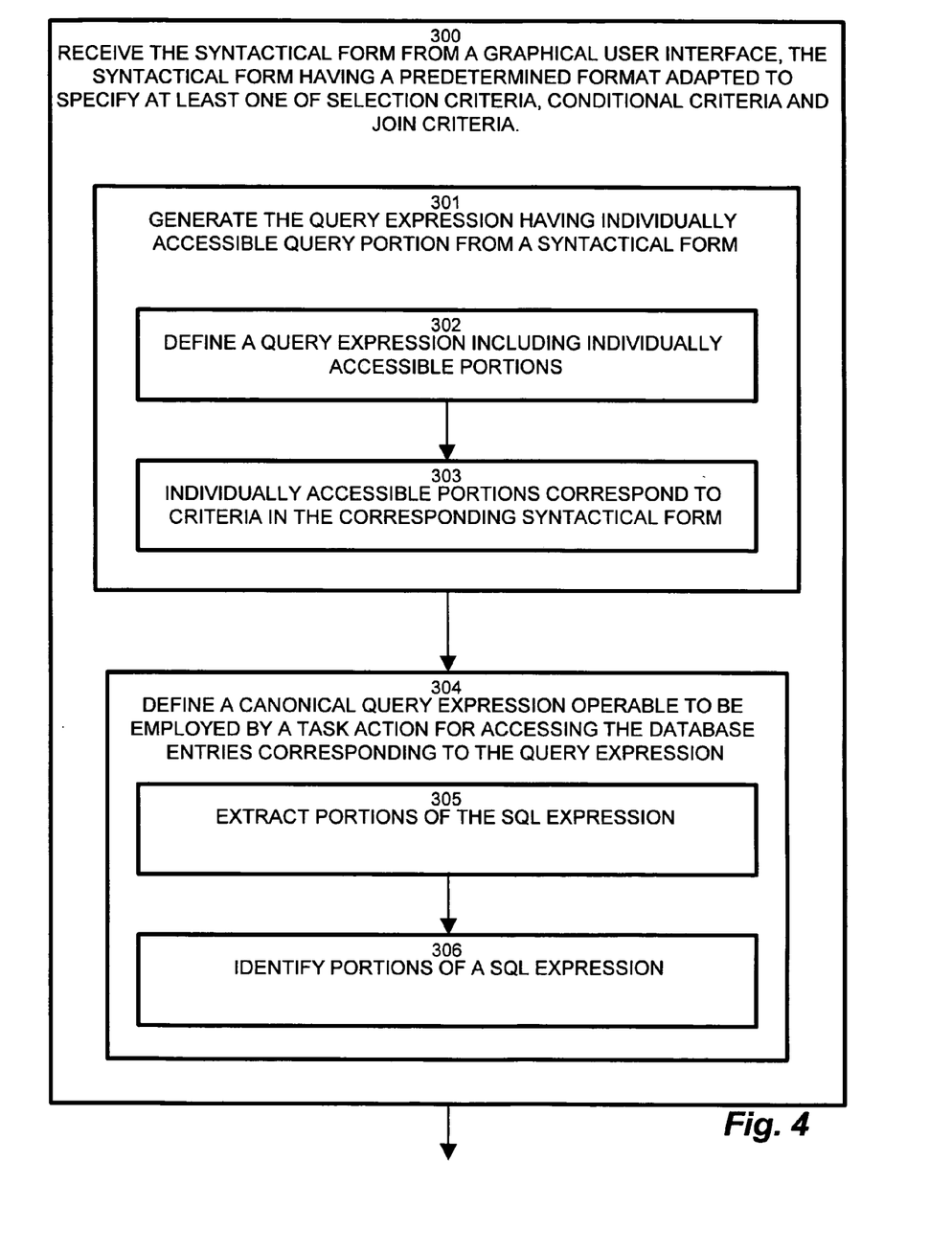
FIGS. 4-6 are a flowchart of canonical query definition and invocation according to the diagram in FIG. 3.
Figure 5:
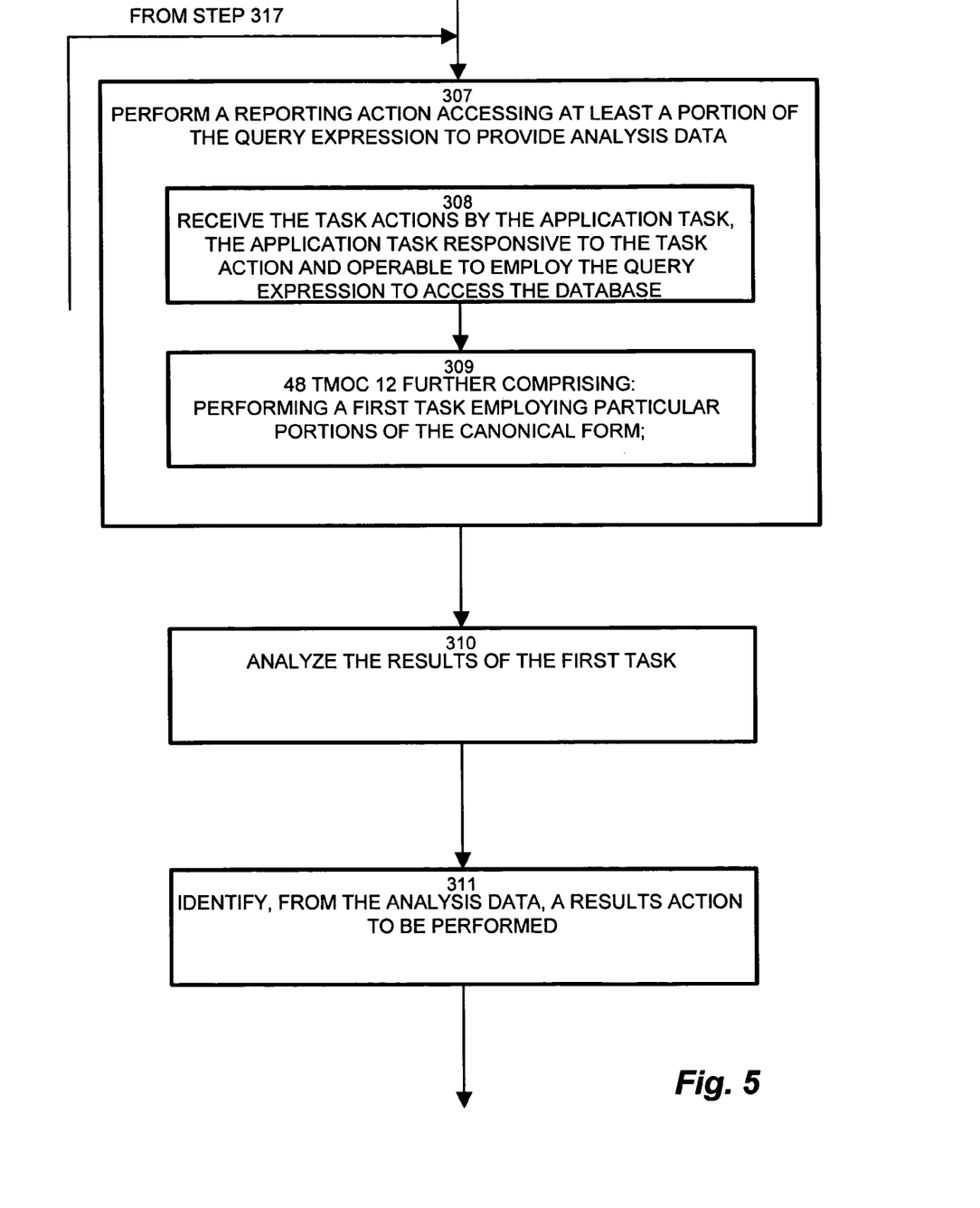
Figure 6:
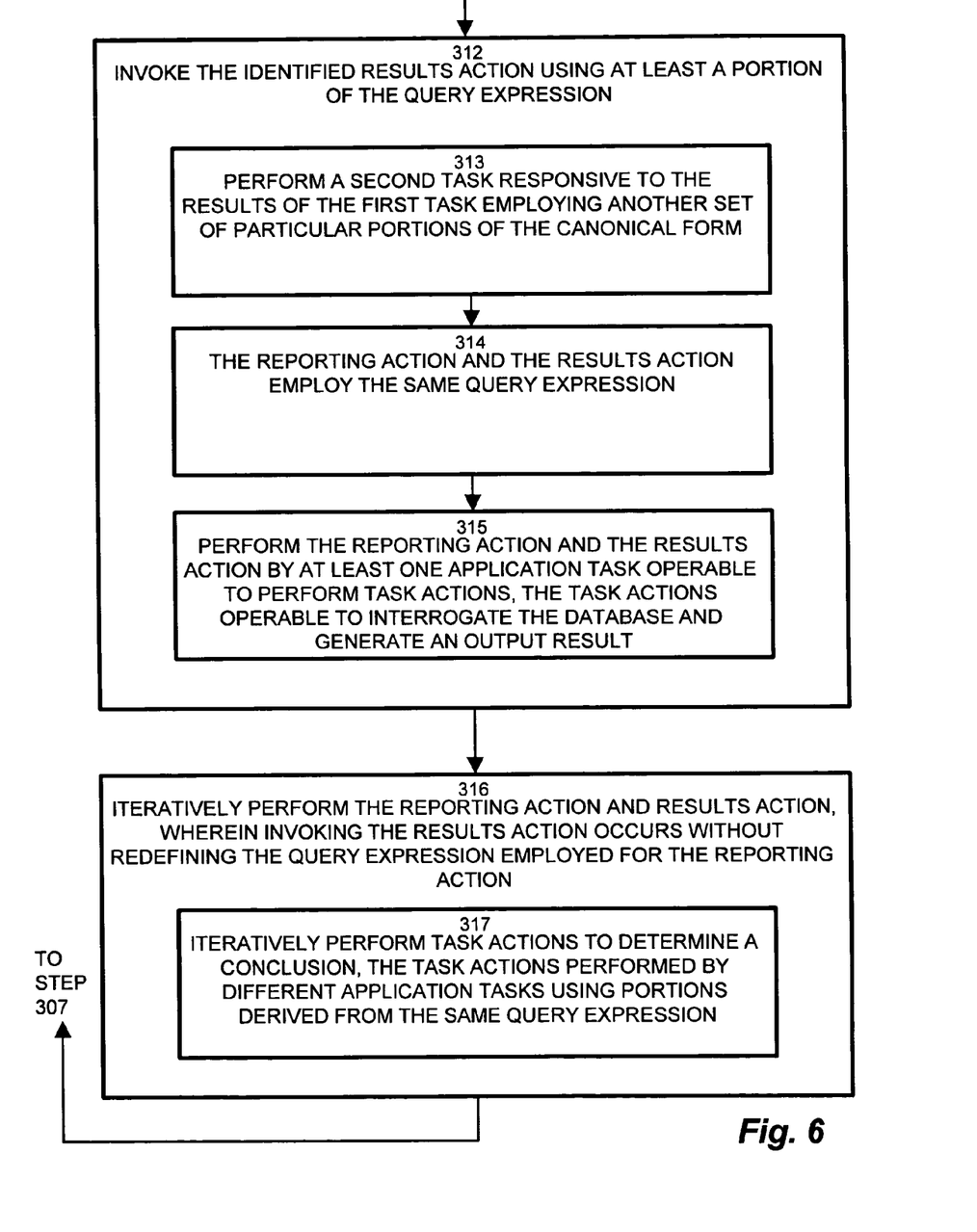

FIGS. 4-6 are a flowchart of canonical query definition and invocation according to the diagram in FIG. 3. Referring to FIGS. 1 and 3-6, at step 300, the management application 112 receives the syntactical form 170 from a graphical user interface 122, in which the syntactical form 170 has a predetermined format adapted to specify at least one of selection criteria, conditional criteria and join criteria, typical of relational DB queries. From the syntactic form 170, which in the exemplary configuration is a SQL statement, the canonizer 172 generates the canonical query expression 174, having individually accessible query portions, from the syntactical form 170, as depicted at step 301. Defining the canonical metadata query definition includes, at step 302, defining a query expression including individually accessible portions, such that the individually accessible portions correspond to criteria in the corresponding syntactical form, as depicted at step 303. In the exemplary configuration, the portions of the canonical form (expression) 174 correspond to clauses in the SQL syntax, such as SELECT, FROM and WHERE, to name several.

At step 304, the canonizer 172 defines the canonical query expression 174 such that it is operable to be employed by a task action 150 for accessing the database entries corresponding to the query expression. Therefore, at step 305, defining the query expression further includes identifying portions of the SQL expression 170, and extracting (i.e. parsing) portions of the SQL expression 170, as shown at step 306. The management application 112 invokes a particular application task 150 to perform a reporting action that accesses at least a portion of the query expression 174 to provide analysis data, as depicted at step 307. Performing the reporting action includes the management application 112 performing the task actions by invoking the application task 150, the application task 150 responsive to the task action request 140 and operable to employ the query expression 174 to access the database 118 via a query request 180, as shown at step 308. In the exemplary configuration, the task action invocation may include performing a first task employing particular portions of the canonical form 174 of the query expression, as depicted at step 309, as a series or sequence of task actions.

At step 310, the management application analyzes the results 182 of the first task, usually via the GUI 122 in the form of a report display. At step 311, a user, operator, or automated process identifies, from the analysis data, a results action to be performed. The results action is a successive invocation of another application task 150. The successive results action may either refine the results of the previous task action, or may be responsive as in the case of a task action for correcting a condition, such as shifting or reorganizing storage arrays.

At step 312, the management application 112 invokes the identified results action (application task 150) using at least a portion of the canonical form 174 of the query expression. Thus, the invoked application task 150 performs a second (or successive) task responsive to the results of the first task employing another set of particular portions of the canonical form 174, as depicted at step 313. As depicted at step 314, the reporting action and the results action employ the same query expression 174. In this manner, the management application 112 performs the reporting action and the results action by invoking at least one application task 150 operable to perform task actions, such that the task actions are operable to interrogate the database and generate an output result 182.

More generally, the report and result tasks (i.e. first and second task actions) may include a series of report or analysis tasks, followed up by one or more responsive actions. Therefore, the management action 112 may iteratively perform the reporting action and results action, such that invoking the results action occurs without redefining the query expression employed for the reporting action, as depicted at step 316. In such a scenario, the reporting action and results action are both task actions performed by the application tasks 150, and iteratively perform task actions to determine a conclusion, such that the task actions are performed by different application tasks 150 using portions derived from the same query expression 174, as depicted at step 317. In the iterative scenario, control reverts back to step 307 for performing another application task 150 using the canonical query expression 174, enabling an operator to successively invoke application tasks 150 for performing task actions to analyze and correct a particular problem or scenario.

Those skilled in the art should readily appreciate that the programs and methods for defining a canonical metadata query definition as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for defining a canonical metadata query definition has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A computer-implemented method in which a computer system initiates execution of software instructions stored in memory for defining a canonical metadata query definition, the computer-implemented method comprising:

defining a query expression including query portions, the query portions being individually accessible by a database responsive to the query expression, the database maintaining transactional data collected from a plurality of manageable entities within a storage area network;

performing a reporting action accessing at least one of the defined query portions of the query expression to provide analysis data;

identifying, from the analysis data, a results action to be performed; and invoking the identified results action using at least a portion of the query expression, further comprising performing the reporting action and the results action by at least one application task operable to perform task actions, the task actions operable to interrogate the database and generate an output result, the reporting action and results action both being task actions, further including iteratively performing task actions to determine a conclusion, the task actions performed by different application tasks by reusing query portions derived from a same query expression in successive queries by other application tasks.

2. The computer-implemented method of claim 1 further comprising generating the query expression having individually accessible query portion from a syntactical form; and wherein the reporting action and the results action employ the same query expression.

3. The computer-implemented method of claim 2 further comprising receiving the syntactical form from a graphical user interface, the syntactical form having a predetermined format adapted to specify at least one of selection criteria, conditional criteria and join criteria.

4. The computer-implemented method of claim 3 wherein the individually accessible portions correspond to criteria in the corresponding syntactical form.

5. The computer-implemented method of claim 1 further comprising:
receiving the task actions by the application task, the application task responsive to the task action and operable to employ the query expression to access the database;
performing a first task employing particular portions of a canonical form;
analyzing results of the first task; and
performing a second task responsive to the results of the first task employing another set of particular portions of the canonical form, the second task being a corrective action to correct a problem associated with the storage area network.

6. The computer-implemented method of claim 5 wherein defining the query expression further comprises defining a canonical query expression operable to be employed by a task action for accessing database entries corresponding to the query expression.

7. The computer-implemented method of claim 6 further comprising iteratively performing the reporting action and results action, the results action including performing a corrective action, wherein invoking the corrective action occurs without redefining the query expression employed for the reporting action.

8. The computer-implemented method of claim 7 wherein defining the query expression further comprises:
identifying portions of a SQL expression; and
extracting portions of the SQL expression.

9. A database management device for defining a canonical metadata query definition comprising:
an interface operable to define a query expression including query portions, the query portions being individually accessible by a database responsive to the query expression, the database maintaining transactional data collected from a plurality of manageable entities within a storage area network;
at least one application task operable to perform a reporting action accessing at least one of the defined query portions of the query expression to provide analysis data;
a feedback device operable for identifying, from the analysis data, a results action to be performed; and
a management application, having application tasks responsive to the management application for invoking the identified results action using at least a portion of the query expression, the management application for invoking the reporting action and the results action by at least one application task operable to perform task actions, the task actions operable to interrogate the database and generate an output result, wherein the reporting action and the results action employ a same query expression,
the reporting action and results action both being task actions, further comprising iteratively performing task actions to determine a conclusion, the task actions performed by different application tasks by reusing portions derived from the same query expression in successive queries by other application tasks.

10. The device of claim 9 further comprising a canonizer operable to generate the query expression having individually accessible query portion from a syntactical form.

11. The device of claim 10 further comprising a plurality of application tasks operable to iteratively perform the reporting action and results action, wherein invoking the results action occurs without redefining the query expression employed for the reporting action; and
wherein the canonizer is further operable to:
identify portions of a SQL expression; and
extract portions of the SQL expression.

12. A computer program product having a computer readable storage medium operable to store computer program logic embodied in computer program code including instructions encoded thereon that, when executed by a processor, cause the computer to perform steps for defining a canonical metadata query comprising:
computer program code for defining a query expression including query portions, the query portions being individually accessible by a database responsive to the query expression, the database maintaining transactional data collected from a plurality of manageable entities within a storage area network;
computer program code for performing a reporting action accessing at least a portion of the query expression to provide analysis data;
computer program code for identifying, from the analysis data, a results action to be performed;
computer program code for invoking the identified results action using at least a portion of the query expression, further comprising performing the reporting action and the results action by at least one application task operable to perform task actions, the task actions operable to interrogate the database and generate an output result; and
computer program code for iteratively performing the reporting action and results action, invoking the results action to occur without redefining the query expression employed for the reporting action, the reporting action and results action both being task actions, further comprising iteratively performing task actions to determine a conclusion, the task actions performed by different application tasks by reusing portions derived from a same query expression in successive queries by other application tasks.

13. The computer-implemented method of claim 1, wherein defining the query expression comprises:
defining a canonical query expression operable to be employed by a task action for accessing database entries corresponding to the query expression;
identifying the query portions of the query expression; and
extracting the query portions of the query expression.

14. The computer-implemented method of claim 13, further comprising iteratively invoking multiple application tasks using a same canonical portion of the query expression for providing analysis data to the invoking application task, wherein successive uses of canonical portions reuse previously generated canonical portions.

15. The computer-implemented method of claim 6, further comprising subdividing each of the individually accessible portions into a canonical form, the canonical form for invocation by the application task for accessing the database entries corresponding to the individually accessible portions.

16. A computer-implemented method in which a computer system initiates execution of software instructions stored in memory for defining a canonical metadata query definition, the computer-implemented method comprising:
receiving a structured query language (SQL) statement having a predetermined format and specifying at least one criteria;

generating a query expression from the SQL statement, the query expression having individually accessible query portions from the SQL statement;

defining a canonical query expression operable to be employed by a task action for accessing database entries corresponding to the query expression, the database entries including transactional data collected from a plurality of manageable entities within a storage area network;

identifying and extracting the query portions into a canonical form, the canonical form for invocation by an application task for accessing database entries corresponding to the individually accessible portions;

invoking, by the application task, the canonical form of the query expression to identify the database entries corresponding to each individually accessible portion;

performing a reporting action on identified database entries, the reporting action providing a management report, the management report providing information about activity, performance, and throughput of the storage area network;

analyzing the management report to provide analysis data to the invoking application task;

invoking, by another application task, a same canonical form using previously identified database entries from a same database, the invocation providing analysis data to other application tasks;

identifying, from the analysis data, a results action to be performed; and performing the results action using the provided analysis data.

17. The computer-implemented method of claim 16 further comprising iteratively invoking multiple application tasks using a same canonical portion of the query expression for providing analysis data to the invoking application task, wherein successive uses of canonical portions reuse previously generated canonical portions.

18. The computer-implemented method of claim 1, wherein performing the reporting action includes:
  performing the reporting action by a management application of the storage area network, the reporting action accessing at least one of the defined query portions of the query expression, the reporting action providing a management report, the management report providing information about activity, performance, and throughput of the storage area network, the query accessing the transactional data;
  analyzing the management report to provide analysis data; and
  wherein invoking includes invoking the identified results action by the management application of the storage area network.

19. The computer-implemented method of claim 18, wherein invoking the identified results action includes:
  executing a task action that corrects a problem condition by reorganizing storage arrays in the storage area network.

20. The computer-implemented method of claim 18, wherein invoking the identified results action includes:
  executing a task action that deletes all transaction data, from the storage area network, that is older than a given interval of time.

* * * * *